Figure 1:
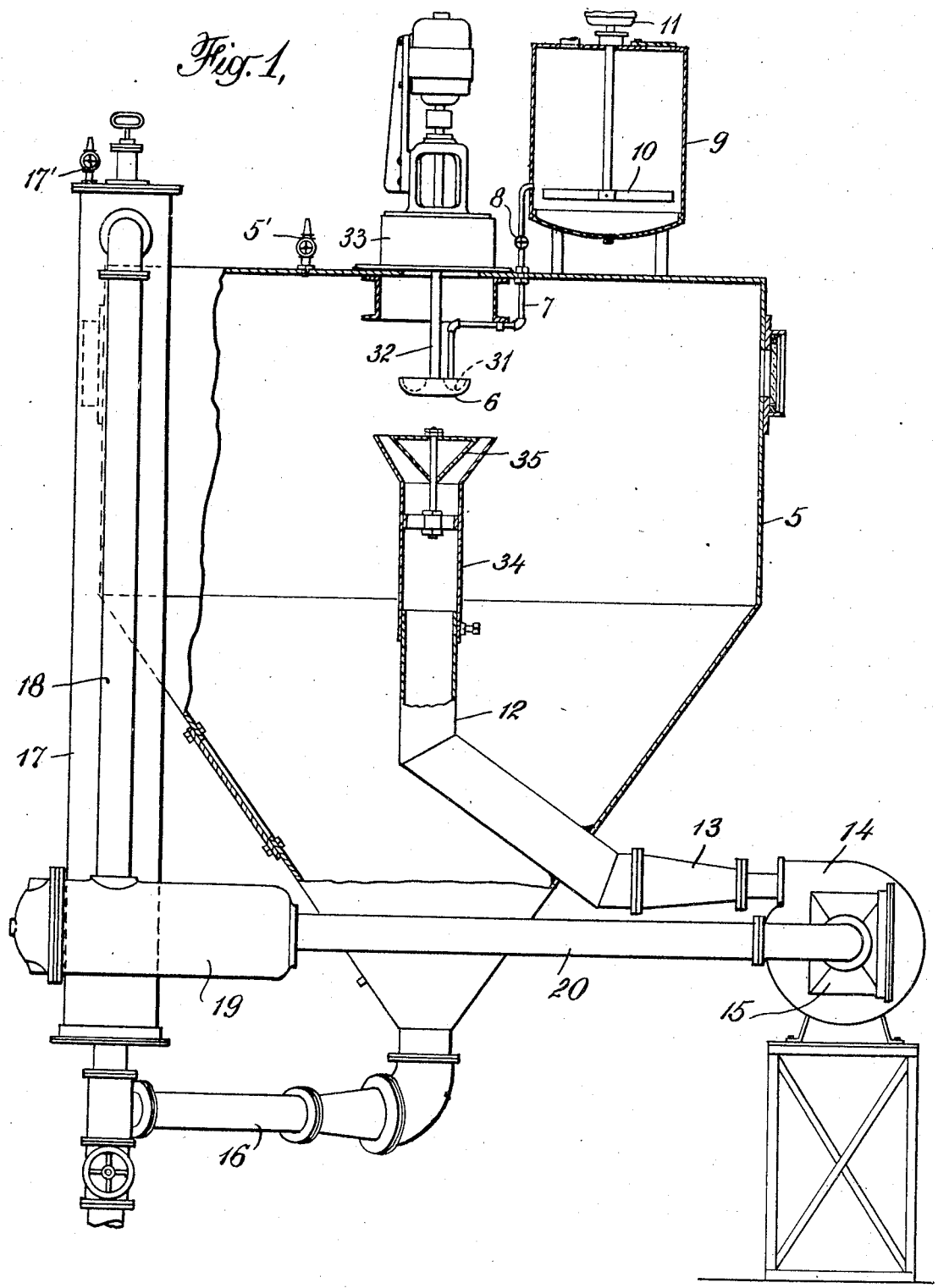

April 29, 1930.　　　L. WEISBERG ET AL　　　1,756,772

METHOD OF COATING MATERIALS

Filed April 25, 1927　　2 Sheets-Sheet 1

INVENTOR
Louis Weisberg and
BY Roger B. Stevens
Pennie Davis Marvin & Edmonds
ATTORNEYS

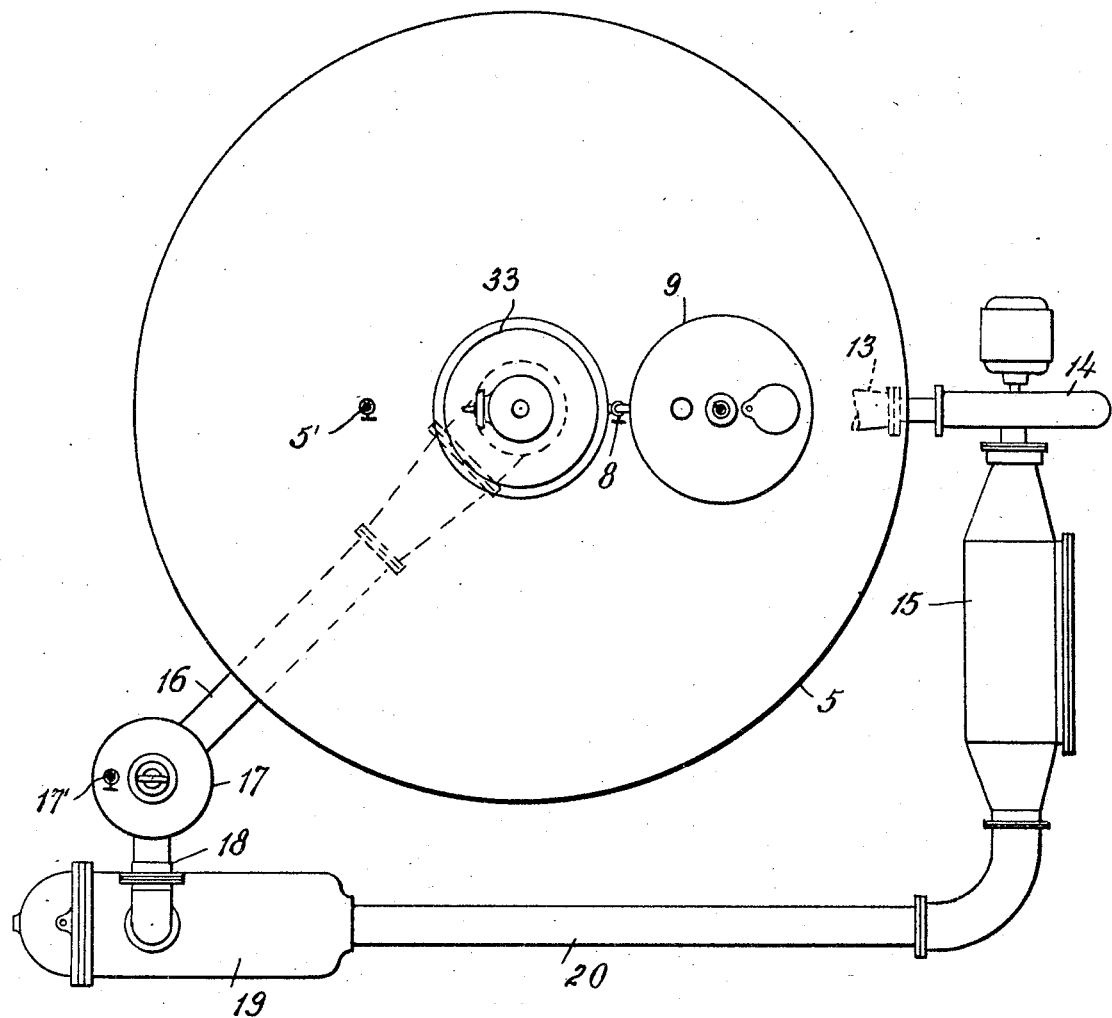

Patented Apr. 29, 1930

1,756,772

UNITED STATES PATENT OFFICE

LOUIS WEISBERG AND ROGER B. STEVENS, OF NEW YORK, N. Y., ASSIGNORS TO ALCHEMIC GOLD COMPANY, INC., OF NEW YORK, N. Y., A CORPORATION OF NEW YORK

METHOD OF COATING MATERIALS

Application filed April 25, 1927. Serial No. 186,479.

This invention relates to the coating of finely divided materials, especially bronze and other metallic powders such as are used, for example, as pigments in paint and ink compositions.

Finely divided metallic particles are widely employed in metallic pigment inks, paints, etc. The metals used are subject ordinarily to oxidation and other corrosive effects and in some cases the color of the metallic particles may be modified considerably by the action of the vehicles in which they are suspended in producing ink and paint compositions, particularly if such vehicles contain any acid constituents. Various attempts have been made to produce non-corrodable metallic powders for use as pigments but with comparatively slight success except in the case of the relatively expensive precious metals.

It is the object of the present invention to provide a process and apparatus whereby metallic particles may be coated successfully with a chemically non-reactive protecting composition which will resist the corrosive action of the atmosphere and of acid and other constituents of paint and ink vehicles.

Other objects and advantages of the invention will be apparent as it is better understood by reference to the following specification and accompanying drawing, in which Fig. 1 is an elevation, partially in section, of an apparatus adapted for use in carrying out the process; and Fig. 2 is a plan view thereof.

The invention is applicable particularly to the coating of finely divided metallic powders. To accomplish the purposes of the invention the ultimate particles of the powder must be individually coated or at least agglomeration of particles in the coated material must be reduced to the minimum so that the product may be in finely divided condition.

We have discovered that the coating can be accomplished effectively by suspending the powdered metal in a solution of a coating composition in a volatile solvent and then dispersing the suspension in a chamber in which it is brought into contact with a heated gaseous medium. Carbon dioxide and nitrogen are examples of available gases which may be used for the purpose. Other gases may be used.

When the suspension is dispersed in the heated gas the solvent vaporizes rapidly, leaving a thin skin of the coating composition on the individual particles of finely divided metal and during the further travel of these particles in the stream of heated gas the coating is hardened by further evaporation of the solvent. The coated particles can then be separated from the gas in any suitable type of apparatus such, for example, as a bag separator and the gas, carrying the vapors of the solvent, can be cooled for the purpose of condensing the solvent for further use in the process. Thereafter the gas can be reheated and again circulated through the apparatus so that the coating operation is substantially continuous.

A suitable coating composition may consist of nitro-cellulose dissolved in a solvent such as butyl acetate or ethyl acetate. Numerous solvents for nitro-cellulose are known and any such solvents which can be vaporized and condensed at practicable temperatures and which yield solutions of suitable viscosity may be employed in the process. The solution should contain an excess of the solvent to effect thorough distribution of the coating composition. As a coating composition, we may use nitro-cellulose alone, or a mixture containing nitro-cellulose and various gums, or a mixture containing nitro-cellulose, gums, and plasticisers—in short, any composition generally described by the term lacquer and especially a pyroxylin lacquer.

In carrying out the invention, the powdered metal is mixed with the solvent containing the coating composition in a suitable tank which is provided with an agitator and the suspension is delivered preferably to a high speed rotary spray head to ensure thorough dispersion of the suspension in the chamber. It is essential that the dispersion be such as to separate the individual particles of metal before any considerable evaporation of the solvent has occurred in order that the individual particles may receive the coating and that the latter may harden before the particles are again in contact with each other, thus avoiding coalescing of the particles and resultant non-uniformity of the particle size in the finished product.

The preferred form of the apparatus for the practice of the invention includes a tower 5 having a relatively large cross-sectional area to permit the dispersion of the suspension therein as hereinbefore described. The tower may be conical at the bottom to facilitate the withdrawal of the gases, vapors and suspended particles therefrom. A tank 9, which is placed above the tower and may be supported upon the top of the tower, is adapted to receive the solution of the coating composition and the finely divided metal powder to be mixed therewith. A stirring device 10 operated, for example, by a motor 11 may be disposed in the mixing tank to maintain suspension of the solid particles in the liquid. The suspension is fed through a pipe 7 having a valve 8 onto the cup-shaped chamber 31 of the high speed rotary spray head 6. This spray head comprises a high speed motor set above or on the tower 5 and having an extended shaft 32 which projects through a packed bearing 33 into the upper part of the tower 5 and terminates at its lower end in the shallow cup-like reservoir 31. This reservoir consists essentially of a disk having a low curved rim at its outer edge. The centrifugal action due to the rapid rotation of the spray head causes a very thin film of the material fed to the reservoir to be thrown off over the rim and become finely dispersed as an almost invisible spray. This spray is subjected to the heating effect of the gas supplied through a central duct 12 which is connected by a pipe 13 to a rotary blower 14. The duct 12 terminates in a sliding conical shaped member 34 which is partly closed at the top by a fixed cone 35, the purpose of which is to cause the gas to leave the duct 12 in the form of a conical annulus, the angle of which may be varied so as to make the gas impinge on the spray thrown off by the spray head at any desired distance from the central vertical axis of the tower 5. The gas which is forced by the rotary blower 14 into the tower is heated in a heater 15 preferably provided with electric heating elements so that the gas may be raised to the temperature desired to effect the volatilization of the solvent in the tower.

The gas carrying the coated particles in suspension and also the solvent vapors is withdrawn at the bottom of the tower through a pipe 16 and delivered to a separator 17, such as a bag separator, in which the solid coated particles are recovered from the gas stream. The gas with the solvent vapors escapes from the top of the separator through a pipe 18 and is delivered to a condenser 19 which may be cooled by any suitable medium such as running water at ordinary temperatures. The cooling of the gas results in the condensation and separation of the solvent vapors and the solvent thus separated is withdrawn from the condenser and returned to the mixing tank 9 to be mixed with an additional quantity of the finely divided metal and the requisite proportion of the coating composition. The gas then passes through a pipe 20 to the heater 15 where it is reheated and again delivered through the pipe 14 to the tower 5 to evaporate the solvent from further quantities of the suspension of powdered metal in the solution of the coating composition.

The gas may be supplied from any suitable source, for example, the tanks in which carbon dioxide and nitrogen are commonly shipped. The tanks are connected to the circulating system preferably at the lowest point of the system. Vents 5' and 17' are provided at the tops of the tank 5 and the separator 17, and in starting the operation these vents are open and the gas is fed into the system while the blower is not in operation and until analysis of the gas in the system indicates a proper concentration of the gas in the atmosphere thereof. Such determinations may be made with ordinary gas analysis apparatus of the Orsat type. Thereafter the blower is started and a further quantity of the gas is supplied while the air vents are open until another determination of the gas content indicates that substantially all oxygen has been removed. Thereafter the vents may be closed and the apparatus may remain in operation with only such additions of gas as may be necessary to make up losses thereof. Determinations of the quality of the gas should be made from time to time to avoid the inadvertent presence of excessive oxygen in the atmosphere.

When the system has been filled with gas as indicated, the heater may be started so that the gas entering the tower is raised to the desired temperature and is fed thereto in a heated condition. Such operation is continued until the tower and connecting apparatus are at a sufficiently high temperature to prevent premature condensation of the solvent. The cooling medium may be supplied then to the condenser and a suspension of powdered metal in the solution of the coating composition may be conveyed to the spray head in regulated amounts. The suspension is disseminated by the spray head through the tower and comes into contact therein with the heated gas with the result that the solvent is rapidly vaporized, leaving the coating on the dispersed metallic particles. As these particles descend in the tower with the gas stream the coating hardens so that by the time the gas suspension reaches the separator 17 the particles may come into contact without coalescing. The coated particles are separated from the heated gas which still carries the solvent vapors. The gas and vapors pass then into the condenser and are cooled sufficiently to separate the solvent in the liquid phase, in which condition it may be returned to the mixing tank for further use. The gas passes then as hereinbefore described to the heater wherein it is again raised to the desired temperature and is used then for the further treatment of the suspension of finely divided metal in the solution of coating composition.

The temperature to which the gas is heated depends in part on the choice of solvent, but is limited by the temperature at which the coating composition is likely to suffer discoloration or decomposition. In general, it is advisable not to let this temperature exceed 200° F. It is evident that for a given solvent this temperature may be controlled within the necessary limits by suitably varying the volume of gas circulated in proportion to the amount of solvent evaporated in the system.

The operation of the process as described permits the successful coating of finely divided metallic particles with compositions which resist corrosive action while maintaining the finely divided condition of the original material. Such coated materials can be utilized in ink and paint compositions and for other purposes in which they are exposed to corrosive action and will maintain their original color and appearance substantially indefinitely in spite of the presence of oxidizing and other corrosive elements.

Various changes can be made in the details of the operation and the apparatus as described without departing from the invention or sacrificing any of the advantages thereof.

The term "chemically non-reactive" hereafter used in the claims is used to designate a material which does not have any substantial chemical action with the particular material being coated.

We claim:—

1. The process of coating finely divided materials, which comprises subjecting a suspension of the material in a volatile chemically non-reactive solvent solution of the coating composition subdivided by centrifugal force to a heated gas and separating the coated material from the gas and solvent vapors.

2. The process of coating finely divided materials, which comprises suspending the material in a volatile chemically non-reactive solvent solution of the coating composition, dispersing the suspension by centrifugal force in a heated atmosphere of a gas and separating the coated material from the gas and solvent vapors.

3. The process of coating finely divided materials, which comprises suspending the material in a volatile chemically non-reactive solvent solution of the coating composition, spraying the suspension into a chamber, introducing simultaneously a blast of heated gas, withdrawing the gas with the coated material and solvent vapors therein and separating the coated material from the gas and solvent vapors.

4. The process of coating finely divided materials, which comprises suspending the material in a volatile chemically non-reactive solvent solution of the coating composition, spraying the suspension centrifugally into a chamber, introducing simultaneously a blast of heated gas, withdrawing the gas with the coated material and solvent vapors therein and separating the coated material from the gas and solvent vapors.

5. The process of coating finely divided materials, which comprises centrifugally dispersing a suspension of the material in a volatile chemically non-reactive solvent solution of the coating composition, subjecting the dispersed material to a heated gas and separating the coated material from the gas and solvent vapors.

In testimony whereof we affix our signatures.

LOUIS WEISBERG.
ROGER B. STEVENS.